Figure 1:
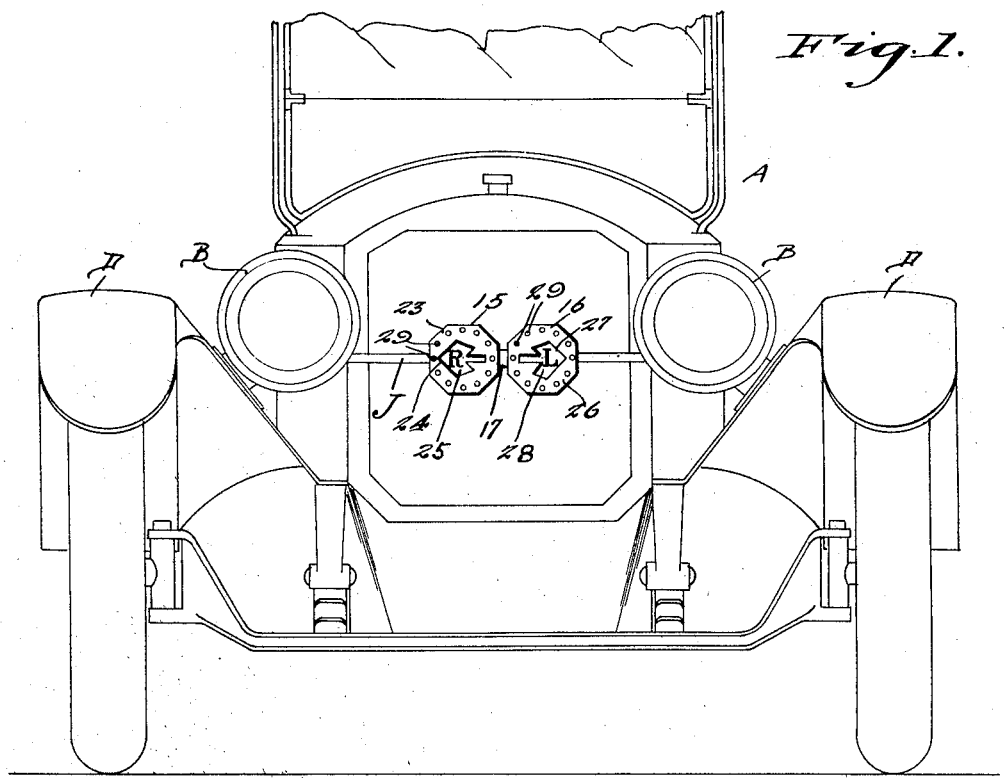

Sept. 1, 1925.  1,552,380
C. F. BALLARD
SIGNAL SYSTEM FOR VEHICLES
Filed Aug. 27, 1923    6 Sheets-Sheet 1

C. F. Ballard INVENTOR
BY Victor J. Evans
ATTORNEY

WITNESS:

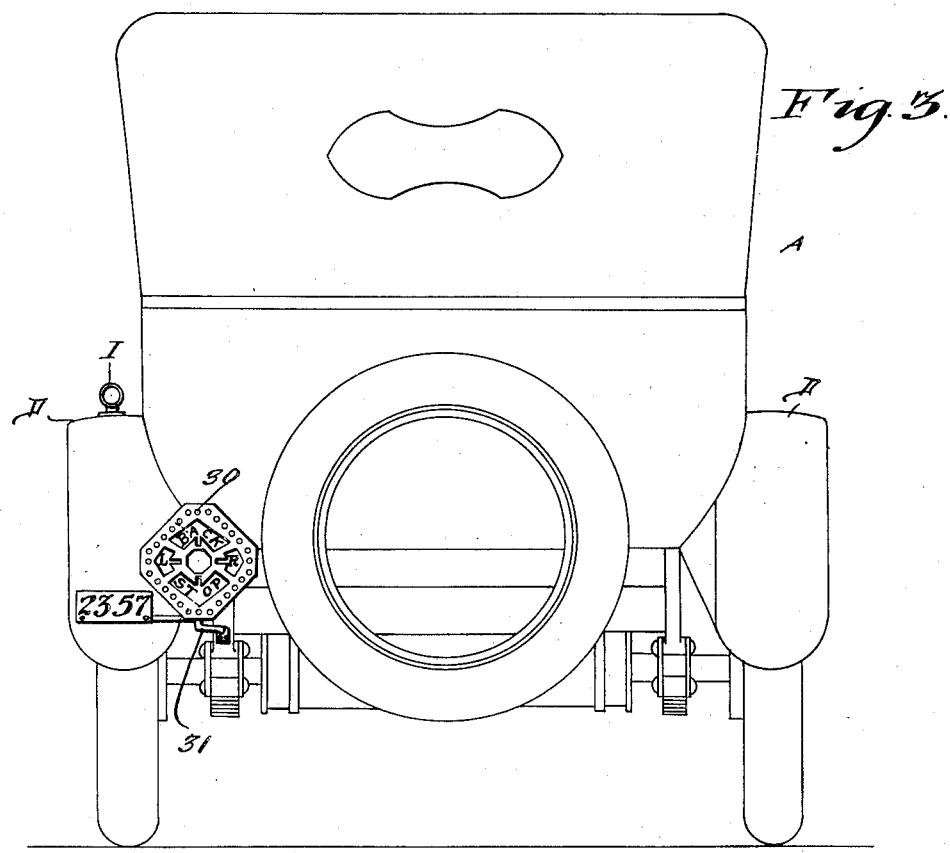
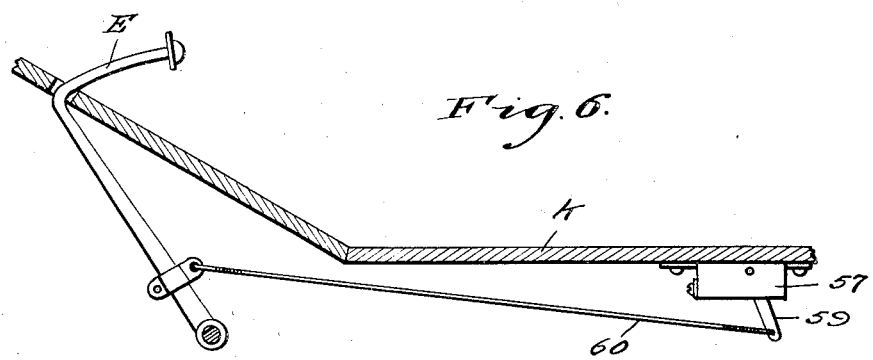
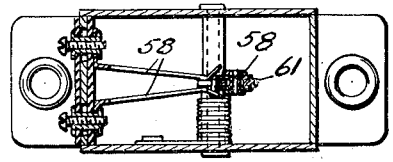

Sept. 1, 1925.

C. F. BALLARD 1,552,380

SIGNAL SYSTEM FOR VEHICLES

Filed Aug. 27, 1923    6 Sheets-Sheet 3

C. F. Ballard, INVENTOR

BY Victor J. Evans

ATTORNEY

Sept. 1, 1925.
C. F. BALLARD
1,552,380
SIGNAL SYSTEM FOR VEHICLES
Filed Aug. 27, 1923          6 Sheets-Sheet 4
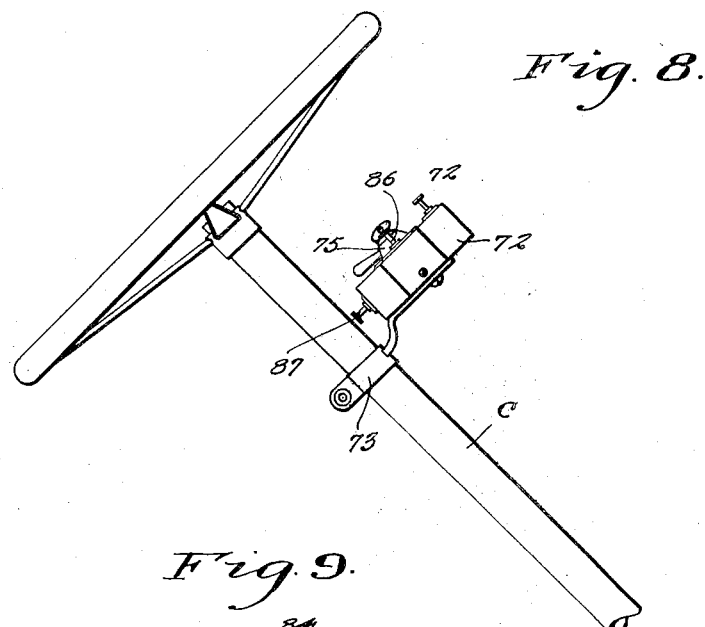
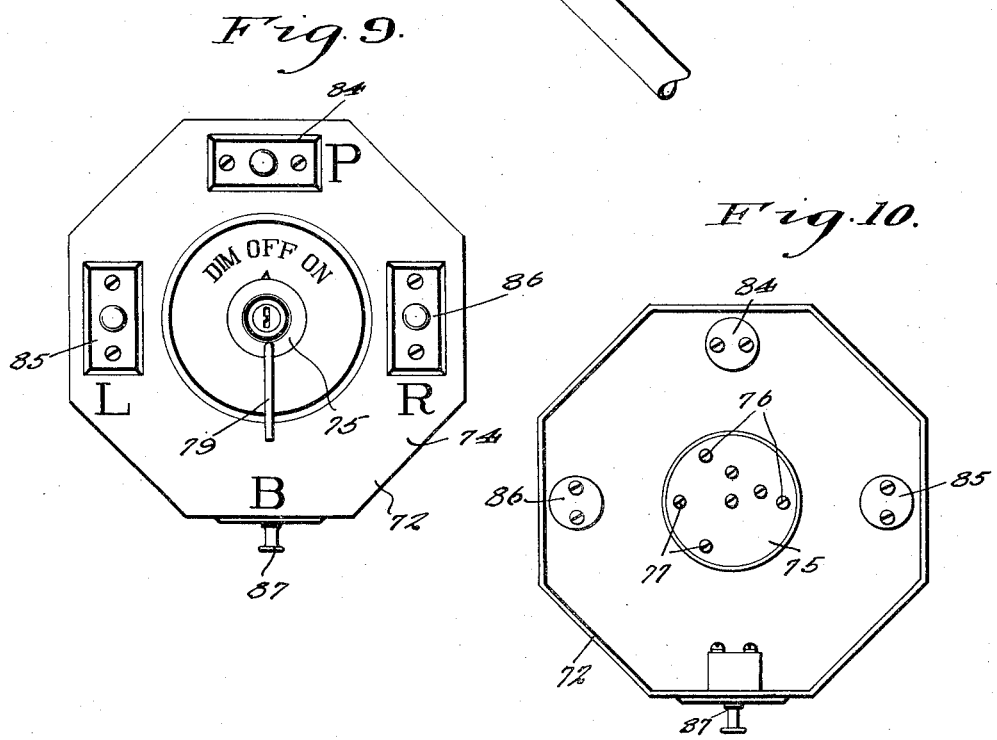
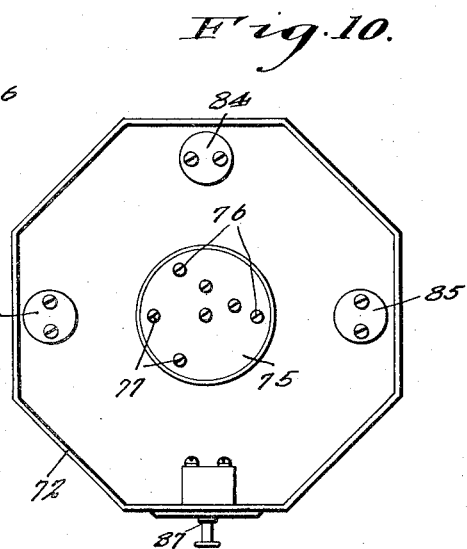

Sept. 1, 1925.
C. F. BALLARD
1,552,380
SIGNAL SYSTEM FOR VEHICLES
Filed Aug. 27, 1923    6 Sheets-Sheet 5
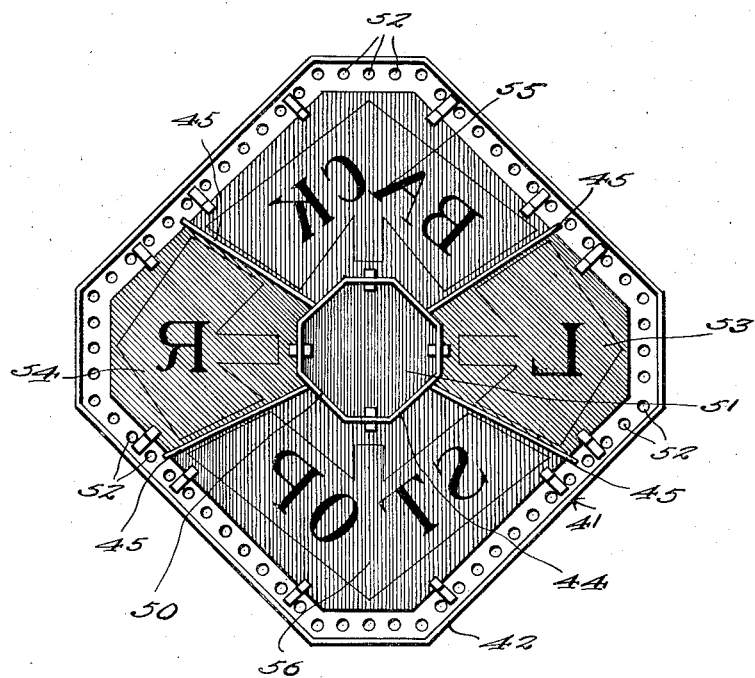
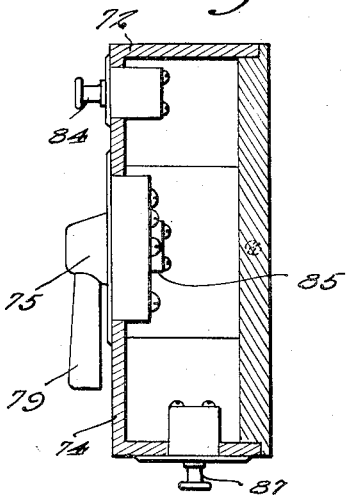
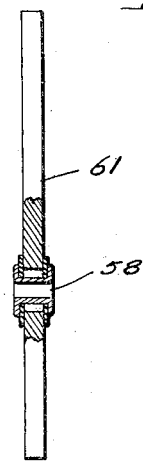

Sept. 1, 1925.
C. F. BALLARD
1,552,380
SIGNAL SYSTEM FOR VEHICLES
Filed Aug. 27, 1923
6 Sheets-Sheet 6
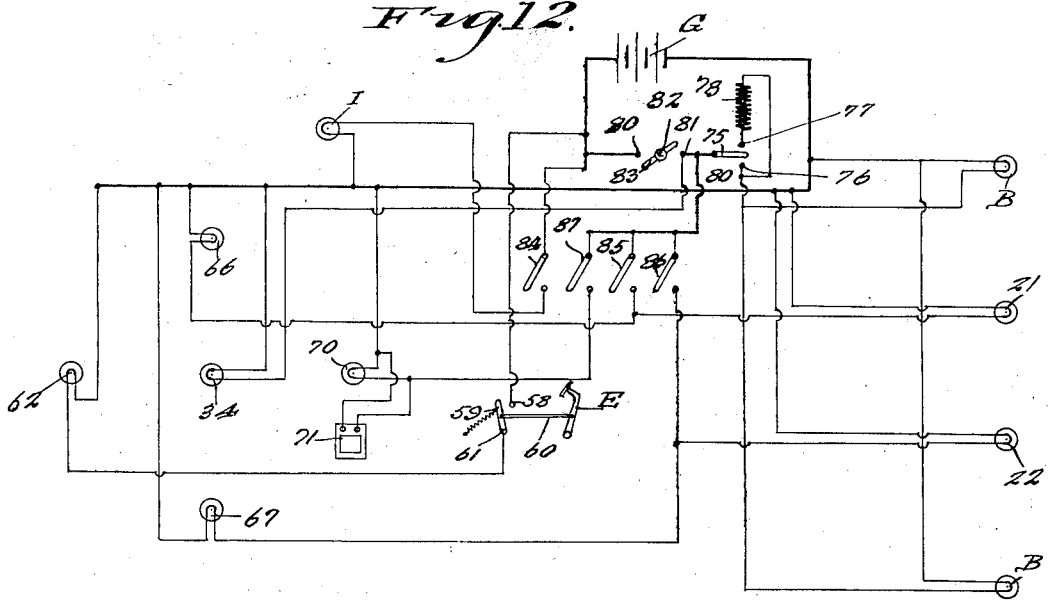
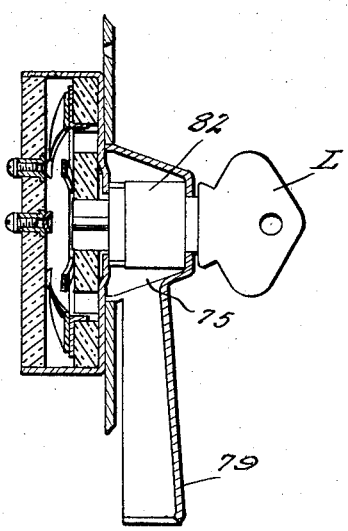
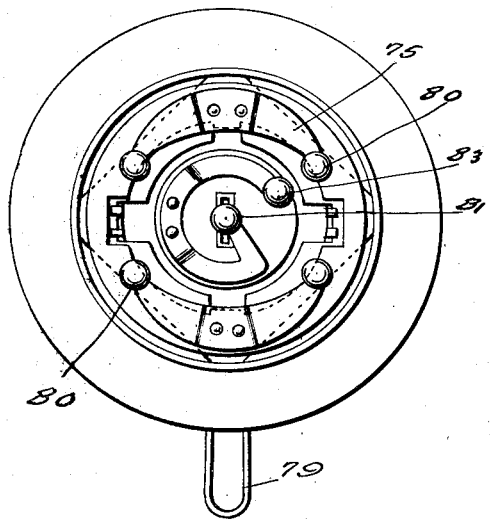

Patented Sept. 1, 1925.

1,552,380

UNITED STATES PATENT OFFICE.

CONNIE F. BALLARD, OF CHATTANOOGA, TENNESSEE.

SIGNAL SYSTEM FOR VEHICLES.

Application filed August 27, 1923. Serial No. 659,676.

*To all whom it may concern:*

Be it known that I, CONNIE F. BALLARD, a citizen of the United States, residing at Chattanooga, in the county of Hamilton and State of Tennessee, have invented new and useful Improvements in Signal Systems for Vehicles, of which the following is a specification.

This invention relates to signal systems, particularly to safety signals for motor or other vehicles, and has for its object the provision of a novel signal system which will operate to apprise the drivers of following and approaching vehicles, traffic officers, pedestrians and in fact all interested parties of an intended turn or a contemplated stop, the device having the great advantage of tending to reduce likelihood of collision and traffic congestion.

An important and more specific object is the provision of a signal system in which the turn signal is given at both the front and rear of the vehicle so that upon approaching a street intersection the traffic officer may be apprised of the driver's desire to turn, the signal at the back being of course for the guidance of the drivers of following cars.

Still another object is the provision of a signal system provided with means whereby a stop signal will be automatically given when the clutch is thrown out or the brake applied preparatory to stopping.

Still another object is the provision of a back up signal which is intended for use when backing to leave a parking place or when backing up at the direction of a traffic officer or under any other conditions, the advantage being that the driver of the immediately following car may be warned and have the opportunity to back his car out of the way.

Yet another object is the provision of a control switch mechanism designed to be mounted upon the steering post of the car and embodying a plurality of separately operable switches for controlling the circuits to the various signals, most of the switches being in series with a key controlled master switch which acts as a lock for rendering the lighting system inoperative so as to prevent tampering therewith by unauthorized persons.

An additional object is the provision of a signal device including a peculiarly constructed lamp box divided into a plurality of compartments over which are transparent legend bearing panes illuminated by energization of the bulbs within the compartments, the casing furthermore carrying a centrally located bulb constituting a tail light mounted in advance of a reflector which has its edges spaced from the front of the lamp box whereby to emit light through a series of holes arranged as a border around the entire device, the illumination of this border making the signal still more conspicuous and constituting an indication as to the make of the system.

Figure 2:
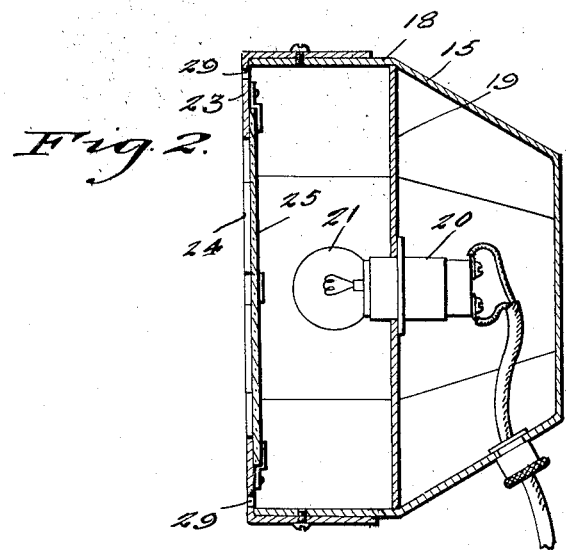
Figure 4:
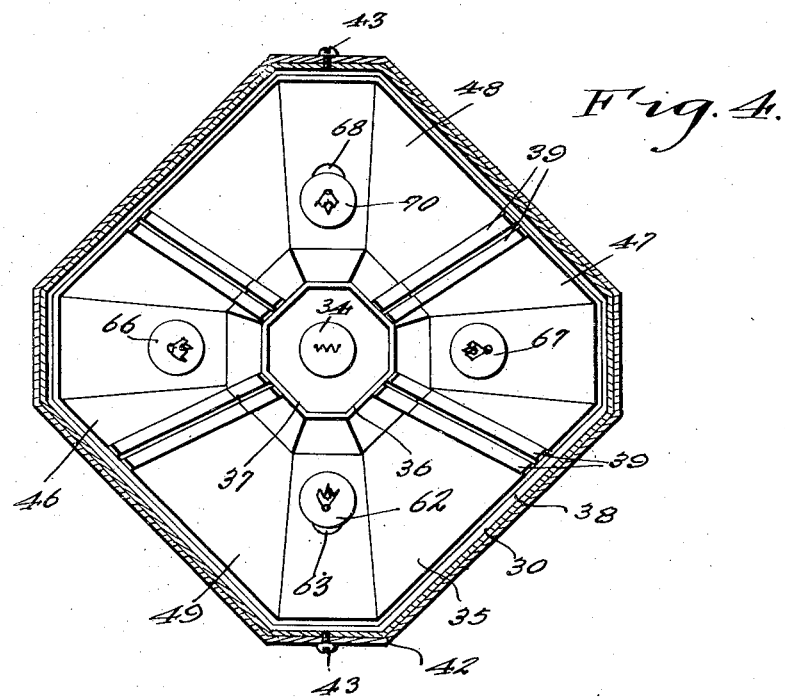
Figure 5:
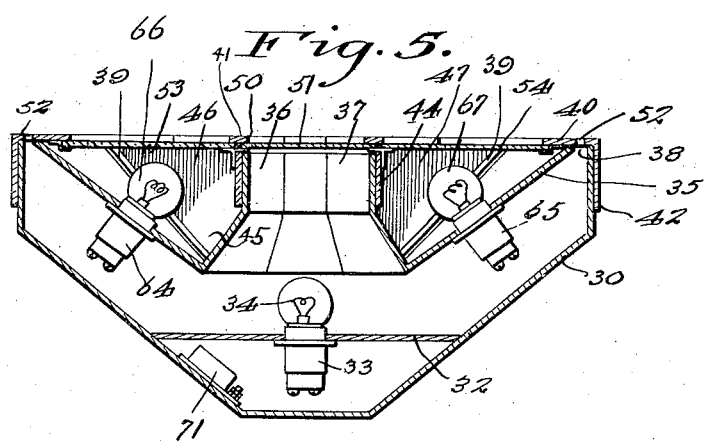

With the above and other objects and advantages in view the invention consists in the details of construction to be hereinafter more fully described and claimed and illustrated in the accompanying drawings, in which:

Figure 1 is a front elevation of an automobile showing the front signal members thereon, Figure 2 is a vertical section through one of the front signal members, Figure 3 is a rear elevation of the automobile showing the rear signal member and the tail lamp, Figure 4 is a vertical section through the lamp box carried by the rear of the vehicle, Figure 5 is a horizontal section therethrough, Figure 6 is a vertical section through the floor of the car showing the stop signal operating switch, Figure 7 is a detail sectional view through the stop signal switch, Figure 8 is a side elevation of the steering column showing the assembled switch device carried thereby, Figure 9 is an enlarged face view of the general control switch, Figure 10 is a view of this switch mechanism with the back plate thereof removed and showing the interior, Figure 11 is a section therethrough, Figure 12 is a diagram of the complete electric circuit for all the devices, The remaining figures are detail views.

Referring more particularly to the drawings the letter A designates an automobile equipped with the usual headlamps B and of course provided with the usual steering column C, fenders D and brake control pedal E. G represents the storage battery. I indicates the parking lamp which is mounted upon the left rear fender or upon any other desired location at the left side of the vehicle.

In carrying out my invention I provide a pair of lamp boxes 15 and 16 suitably mounted at the front of the vehicle by any preferred brackets 17 which might be hung from the rod J which usually extends across the front of the radiator for holding license plates, though of course it should be understood that these brackets might be mounted at any other desired location. Each of these lamp boxes comprises a casing 18 within which is mounted a reflector 19 at the center of which is a socket 20 for containing bulbs 21 and 22, the bulb 21 being in the lamp box 15 and the bulb 22 being in the lamp box 16. The box 15 has its front covered by a plate 23 having a cut out arrow 24 therein covered with green transparent material indicated at 25, while the box 16 has its front normally closed by a plate 26 having a cut out arrow 27 covered with green glass or other material 28. The arrow 24 points to the right while the arrow 27 points to the left. Around the marginal portion of the plates 26 and 23 I provide series of holes 29 which will display white lights when the bulbs are energized.

At the rear of the vehicle I provide a lamp box structure including a casing 30 equipped with a suitable bracket 31 by means of which it may be secured upon any desired part of the rear of the vehicle. This casing 30 is here shown as being of frusto-pyramidal shape though of course there is no limitation in this respect. At the center of the back wall of this casing I provide a small reflector 32 at the center of which is located a socket 33 holding an incandescent bulb 34. Also located within this casing and spaced from the reflector 32 is a relatively large reflector 35 formed with a central opening 36 surrounded by an outstanding flange 37. This reflector 35 is of dished shape or may be construed as being somewhat frusto-pyramidal so as to conform to a certain extent with the shape of the casing 30 though there may be variations within quite wide limits. It should also be stated that the reflector 35 is of less width and length than the inside of the casing so as to define a continuous space 38 between the edge of the reflector 35 and the casing. At spaced points the reflector 35 is formed with pairs of spaced guide strips 39 for a purpose to be described.

The front of the reflector 35 is closed by a cover 40 which includes a plate 41 having a flange 42 telescoping the casing 30 and secured thereto by screws 43 or the like. The rear side of the plate 41 carries a ring or flange 44 which telescopes the flange 37 and which thus holds the reflector 35 properly centered within the casing. Radiating from the flange 44 are angularly shaped partitions 45 which are received between the pairs of strips 39 on the reflector 35 and which operate to divide the interior of the reflector into four compartments 46, 47, 48 and 49.

This front plate 41 is formed with a central opening 50 which registers with the space within the telescoped flanges 44 and 37, and this opening is covered with a piece of red glass indicated at 51, behind which is the bulb 34 which constitutes the tail light. Near its marginal edges the cover is formed with holes 52 which are opposite the space 38 and through which white light shines when the tail light bulb is energized. The cover plate 41 is formed with a green glass covered opening 53 over the compartment 46 and a similar green glass covered opening 54 over the compartment 47, while it is provided with red glass covered openings 55 and 56 over the compartments 48 and 49 respectively. These openings are all so formed as to indicate arrow heads though they might be of any other preferred shape, and it is preferable that the red and green glass panes bear legends such as the letters "L" and "R" on the panes 53 and 54, the legend "Back" on the pane 55, and the legend "Stop" on the pane 56.

Mounted at some convenient location beneath the floor boards K of the vehicle is a switch device including a casing 57 within which is mounted an insulated contact 58 adapted to be engaged by a movable arm 59 which is spring pressed in one direction and which has a flexible connection 60 with either the clutch or brake pedal as preferred. The arm 59 engages a contact 61 for moving this contact into engagement with the contact 58 when the clutch or brake pedal as the case may be is moved forwardly preparatory to stopping the car. The contacts are interposed in circuit with the storage battery G and a bulb 62 held within a socket 63 in the compartment 49 of the lamp box 30.

In the compartments 46 and 47 are sockets 64 and 65 carrying bulbs 66 and 67 respectively, while located in the compartment 48 is a socket 68 carrying a bulb 70. It should also be mentioned that I provide a conventional buzzer 71 located in the casing 30 back of the reflector 35, which buzzer is associated with the bulb 70 and connected in parallel therewith.

Mounted upon the steering column or post C is the control switch mechanism for the entire device which mechanism includes a casing 72 equipped with any suitable bracket or brackets 73 for mounting it in position. Mounted on the cover plate 74 of this casing 72 is a control switch 75 including two sets of contacts 76 and 77 which are connected with the headlamps B and also with the bulb 34 which constitutes the tail light. Interposed between the contacts 77 and the headlamps is a resistance element 78 for the purpose of dimming the headlights. This switch further includes a movable control arm 79 which is located exteriorly of the casing and which carries contacts 80 adapted to be brought into engagement with the contacts 76 or 77. One terminal of the storage battery is brought to one contact 80 while the other contact 80 is connected with a stationary contact 81 of a master switch which includes a key operated barrel 82 carrying a contact 83. It will be seen that it is first necessary to insert a proper key into the barrel 82 for effecting turning thereof to close the circuit through the master switch and thus render the main switch operative, the two switches being in series as shown.

Also located within the casing 72 is a push and pull switch 84 which is interposed in circuit with the source of current and with the parking light I for controlling energization thereof, and this switch 84 has no connection whatever with the master switch or headlight switch.

Carried by the casing 72 are other push and pull switches 85 and 86 which are connected in series each with the master switch and which are connected in circuit with the bulbs 66 and 67 respectively. It is also to be noted that these bulbs 66 and 67 are connected in parallel with the bulbs 21 and 22 of the front signal members so that they will be simultaneously energized.

Mounted at the lower portion of the casing 72 is a suitable switch 87 which is likewise in series with the master switch and which is connected with the bulb and buzzer 70 and 71 respectively.

The operation is as follows:

By operating the switch 84 the lighting of the parking lamp I is controlled irrespective of all the other switch devices. In order to turn on the lighting system of the car it is first necessary to insert the proper key L within the barrel 82 and turn the same to the left which closes the circuit through the master switch 81 and main switch 75. By turning the lever arm 79 to the left and bringing the contacts 80 into engagement with the contacts 76 the headlights will be brightly lighted while by turning the lever to bring the contacts 80 in engagement with the contacts 77, the headlights will be lighted dimly owing to the provision of the resistance 78 in the circuit.

In case the operator intends to turn to the left, he operates the switch 85 whereupon current flows through the master switch and switch 85 through the bulbs 66 and 15 so that the green arrow pointing to the left at the rear and also at the front of the vehicle will be illuminated, and if he wishes to turn to the right, he operates the switch 86 whereupon the bulbs 67 and 22 are energized for illuminating the green arrows pointing to the right. In case the operator is parked or has stopped for any reason and intends to back, it is intended that he operate the switch 87 whereupon current will be supplied to the bulb 70 and buzzer 71 so that the legend "Back" will be illuminated while at the same time the buzzer will be energized to give an audible alarm so that the attention of the driver of the immediately following car will be attracted. The switches 84, 85, 86 and 87 are of the push and pull type and are so constructed that when actuated they will remain in such position until positively released so that after giving a signal the operator has his hands free for manipulating the steering wheel or for accomplishing anything else necessary.

If the operator applies the brake or pedal to stop, the arm 59 moves the contact 61 into engagement with the contact 58 and closes the circuit through the bulb 62 so that the stop signal is illuminated.

From the foregoing description and a study of the drawings it will be apparent that I have thus provided a simply constructed and comparatively inexpensive signaling device which will be a great safe guard to the motorists and to the general public while at the same time it will greatly assist in avoiding traffic congestion. Ample provision has been made for taking care of all the incidents of traffic or travel and it is believed that the device should have a long life and satisfactorily perform all of its functions.

While I have shown and described the preferred embodiment of my invention it is of course to be understood that I reserve the right to make such changes in the form, construction and arrangement of parts as will not depart from the spirit of the invention or the scope of the subjoined claims.

Having thus described my invention I claim:

1. In a signal device, a lamp box formed as a casing, a reflector in the back thereof, a socket carrying an incandescent bulb located at the center of said reflector, a second reflector spaced from the back wall of the casing and having a central opening surrounded by an outstanding flange, a cover having a central opening surrounded by an inwardly extending flange telescoping said first named flange, spaced pairs of guides on said second named reflector and radially arranged partitions carried by said second named flange and engaged within said guides to define a plurality of compartments, and sockets carrying incandescent bulbs within the respective compartments, said cover being formed with openings covered with transparent material carrying legends disposed over the respective compartments.

2. In a signal device, a lamp box structure including an outer casing of polylateral formation, a reflector extending transversely of the casing in relation to the back wall thereof, a bulb carrying socket located at the center of said reflector, a second reflector secured within the casing in spaced relation to the walls thereof and having a shape conforming to the configuration thereof, said second named reflector having a central opening surrounded by a flange, said opening being in line with the central portion of the first named reflector, a plurality of pairs of spaced guide strips located on the second named reflector at opposite sides of certain faces thereof, bulb carrying sockets extending through the second named reflector between successive pairs of guide strips, and a cover telescopically engaged upon the front of the casing, said cover being formed centrally with a flange telescoping upon said first flange and being provided further with a plurality of radial partitions leading between the pairs of guide strips whereby to divide the space between the cover and the second named reflector into a series of separate compartments, the cover having separate translucent or transparent portions covering the respective compartments.

In testimony whereof I affix my signature.

CONNIE F. BALLARD.